April 20, 1965  M. R. SIMMONDS  3,178,810
METHOD OF FASTENING
Original Filed Aug. 18, 1958  2 Sheets-Sheet 1
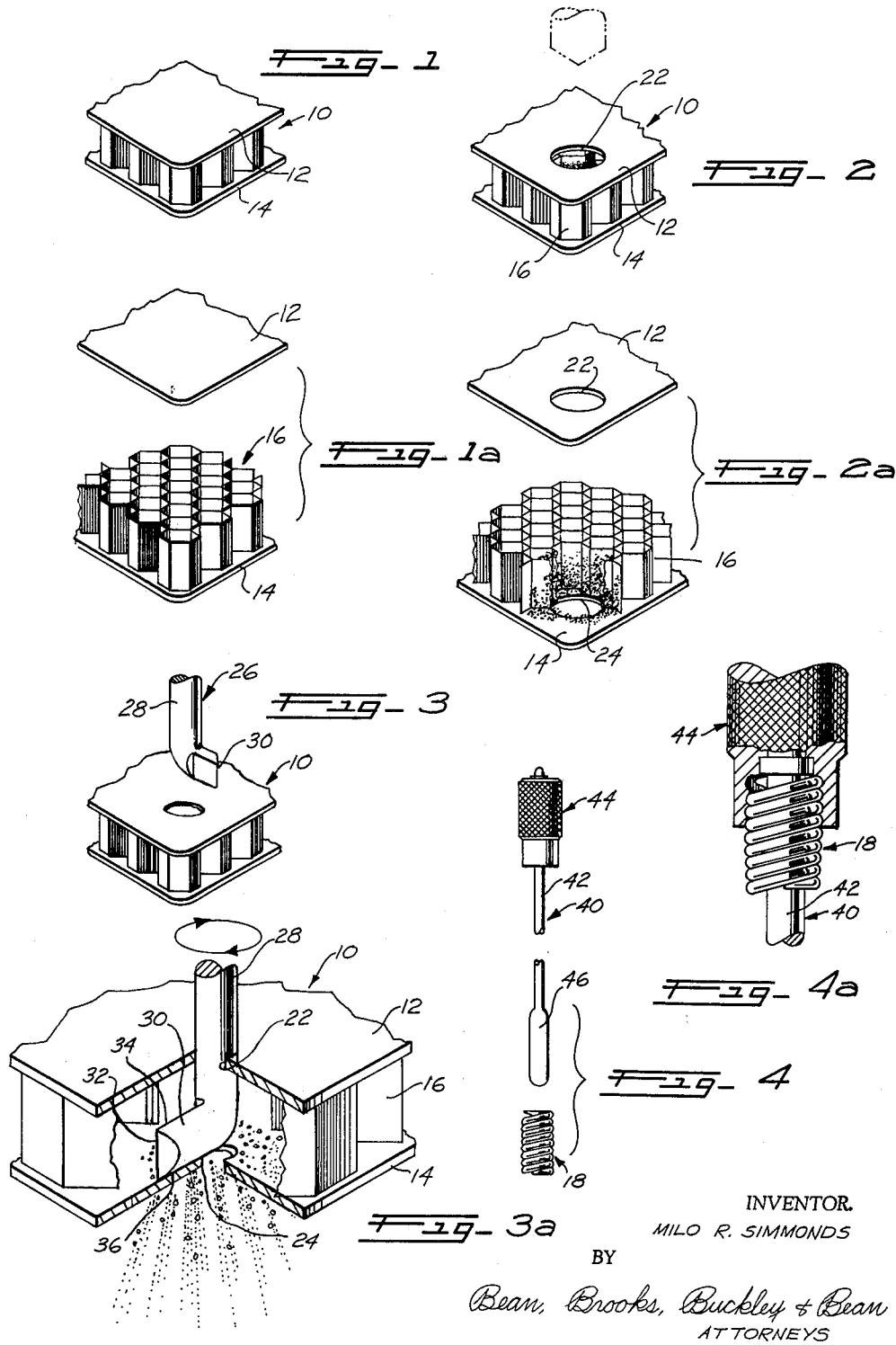
INVENTOR.
MILO R. SIMMONDS
BY
Bean, Brooks, Buckley & Bean
ATTORNEYS April 20, 1965   M. R. SIMMONDS   3,178,810
METHOD OF FASTENING
Original Filed Aug. 18, 1958   2 Sheets-Sheet 2

INVENTOR.
MILO R. SIMMONDS
BY
Bean, Brooks, Buckley & Bean
ATTORNEYS

3,178,810
Patented Apr. 20, 1965

3,178,810
METHOD OF FASTENING
Milo R. Simmonds, 34 Hirschfield Drive,
Williamsville, N.Y.
Original application Aug. 18, 1958, Ser. No. 755,524, now Patent No. 3,061,054, dated Oct. 30, 1962. Divided and this application Oct. 29, 1962, Ser. No. 233,843
1 Claim. (Cl. 29—456)

This application is a division of my copending application Serial No. 755,524, filed August 18, 1958, now Patent No. 3,061,054.

This invention relates generally to the fastener art, particularly as applied to double wall structures and structural sandwiches of the type having relatively high strength skins or laminae spaced apart by a relatively weak core. More specifically, this invention is concerned with the method of providing spacer means between pre-assembled high strength laminae which receive fastening means therethrough.

Structures of the above mentioned type offer many advantages and have a wide area of application, but fastening to such sandwiches presents a serious problem because the stabilizing core cannot carry the fastening load and it is necessary to transfer such fastening loads to the relatively high strength laminae in order to avoid distorting the core.

Accordingly, it is a primary object of this invention to provide a method enabling fastening to such structures wherein the fastening load is transferred directly to the relatively high strength, stressed laminae wihout crushing the relatively weak core material and/or deforming the skin.

Further, it is an object of this invention to provide a method of inserting a spacer member in the pre-assembled sandwich structure, which method is characterized in one aspect thereof by rotating the spacer member about substantially its lengthwise axis to thread it through an opening in one lamination, until the spacer member extends partially therethrough into the space between the laminations, and then rolling the spacer member in the opposite direction about the periphery of the opening, in a manner causing the spacer member to continue threading through the opening until it is inserted entirely between the laminations.

Other objects and advantages of the invention will appear from the description hereinbelow and the accompanying drawing wherein:

FIG. 1 is a perspective view showing a portion of a structural sandwich;

FIG. 1A is a view similar to FIG. 1 but showing the top lamina removed from the structure to illustrate the stabilizing core;

FIG. 2 is a view similar to FIG. 1 but illustrating the first step in the method;

FIG. 2A is a view similar to FIG. 1A and illustrating clearly the provision of the drilled hole through both of the skin elements or laminae;

FIGS. 3 and 3A illustrate the step of cleaning out the core material in the region of the openings through the skin elements to provide working space;

FIGS. 4 and 4A illustrate a tool which may be used in the method according to the present invention.

Figure 5A:
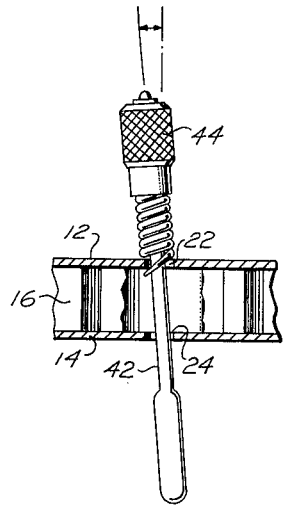
FIGS. 5A–5F illustrate various sequential steps in the assembly method.
Figure 5B:
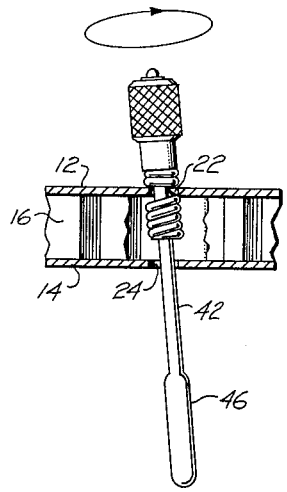

Referring now more particularly to FIGS. 1 and 1A, there is shown a structural sandwich 10 of conventional construction, which per se comprises no part of my invention. This sandwich comprises a pair of high strength skins or laminae 12 and 14, bonded to and spaced apart by a low density core 16, substantially as is shown. The sandwich comprising the parts 12, 14 and 16 can be of any known construction, or variation thereof, my invention being directed to the method whereby fastening or attachment loads may be directly transferred to the laminae 12 and 14 without crushing the core 16 or deforming the laminae or skin. To accomplish this end, a spacer indicated generally by the reference character 18 as is shown in FIG. 5F is ultimately inserted between the laminae 12 and 14 and the spacer 16 is of such construction that when disposed in the position shown in FIG. 5F, the spacer has a solid length which is substantially equal to the spacing between the inner surfaces of the laminae 12 and 14. In this fashion, the fastener such as is illustrated diagrammatically at 20 in FIG. 5F when inserted through the sandwich assembly 10 will not tend to crush the core 16 or deform the skin elements 12 and 14.

In the method of inserting the spacer as aforementioned, the sandwich 10 is first drilled as is illustrated in FIGS. 2 and 2A so as to provide openings 22 and 24 in the top and bottom skin elements 12 and 14 thereof. It will be appreciated that the openings 22 and 14 are aligned as is shown clearly in FIG. 5F so as to readily receive the fastener element 20 therethrough. After the holes 22 and 24 have been drilled, the core material 16 is removed within a sufficient area therearound to provide room for the spacer 18. This may be accomplished by means of a tool such as the back spotface tool 26 illustrated in FIGS. 3 and 3A. The shank 28 of this tool is of less diameter than the openings 22 and 24 and terminates at one end in a bit or blade portion 30 extending generally at right angles thereto, the bit having a cutting edge 32 at its outer end and cuting edges 34 and 36 along its top and bottom edges respectively. To enable insertion of the blade or bit portion 30, the diagonal distance across the heel thereof is less than the diameter of openings 22 and 24 and any suitable handle mechanism (not shown) enables the operator, after inserting the tool as is illustrated in FIG. 3A, to rotate the shaft 28 about its axis while raising and lowering the bit 30 between the laminae 12 and 14 so that a generally cylindrical piece of core material is removed, substantially as is shown in FIG. 3A. While it is not necessary that all of the material in such cylinder be removed, it is desirable to remove the glue or resin from the underside of both skin sheets 12 and 14 so as to permit the spacer member to seat properly against the opposed surfaces of the skin or laminae 12 and 14.

The spacer 18 is threaded into the sandwich ultimately into the position shown in FIG. 5F by means of a tool indicated generally by the reference character 40 in FIGS. 4 and 4A. This tool comprises an elongate shaft 42 which is of a length exceeding the length of the spacer member 18 so as to extend therethrough and which is of a diameter less than the difference between the diameter of the openings 22 and 24 and the width of the wire from which the spacer element 18 is formed. The shaft 42 is provided at one end thereof with a handle or head 44 and which head or handle 44 is rotatably received on the upper end of the shaft 42. The underside of this head 44 is provided with a counterbore which is internally threaded to receive the upper end of the spacer 18 so that when in the position shown in FIG. 4A, the spacer is effectively clutched or locked to the head 44. The lower end of the shaft or shank 42 is provided with an enlarged bulbous portion 46 which has a diameter slightly less than the inside diameter of the spacer 18.

For assembling the spacer 18, the same is slipped onto the shaft 42 and threaded into the handle or head 44 substantially as is shown in FIG. 4A. Then, the shaft 42 is inserted through the aligned openings 22 and 24 as is illustrated in FIG. 5A and caused to bear against one side edge of the upper opening 22 and the opposite side edge of the other opening, as shown, whereafter the handle or head 44 is rotated in a direction causing it to clutch with the spacer 18 and thread the same partially through the uppermost opening 14 with this action being continued, for example, until the spacer 18 is in approximately the position illustrated in FIG. 5B. The spacer 18 can be inserted in this manner anywhere from part of a turn to all the way down until the handle or head 44 engages the top laminae 12.

Figure 5C:
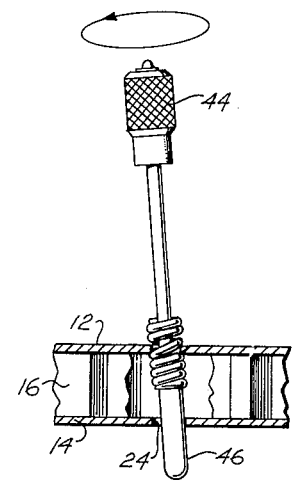
Figure 5D:
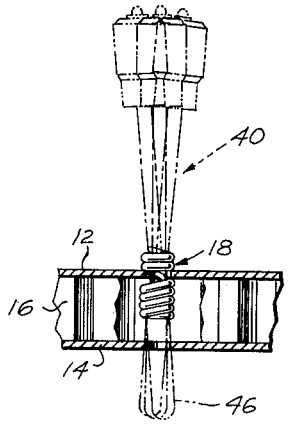
Figure 5E:
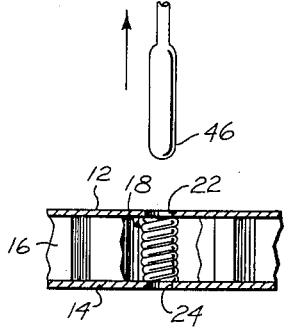
Figure 5F:
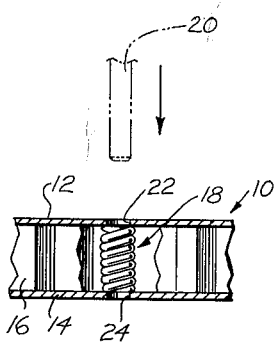

Then, the head 44 is turned in the opposite direction as illustrated in FIG. 5C out of clutching engagement with the adjacent end of the spacer 18 and the tool withdrawn upwardly as is shown in FIG. 5C so that the bulbous lower end portion 46 is within the confines of the lower opening 24. The head or handle 44 is then swung in the opposite direction in an orbit about the centerline of the openings while maintaining contact between the shaft or shank 42 and opposed peripheral side edges of the openings, as is illustrated in FIG. 5D. Upon so doing, the shank 42 rolls around the periphery of the upper opening 22 rotating in the original direction in a manner similar to the sun gear in a planetary gear train. At or near the point where the shaft or shank 42 contacts the opening 22 in the upper skin 12, the spacer passes through the upper skin opening and as the shaft 42 rolls around the edge of such opening it moves the spacer continually to a new entry point which is further and further up the spacer. Due to the friction inherent in the above action, the spacer 18 rotates very slowly in the same direction as the inserting tool is swung.

Thus, after being rotated about its axis in one direction until it is partially threaded through the upper opening 22, the spacer 18 is swung in the opposite direction in a generally conical path about the centerline of the opening. This action is continued until the spacer 18 is entirely between the two laminae 12 and 14 of the sandwich, and several continued rotations of the shaft 42 serve to center both the upper and lower ends of the spacer with respect to the openings 22 and 24. Further, as the inserting tool is removed from the openings, the bulbous lower end portion 46 thereof further assures centering of the spacer 18, and the spacer is ready to have a bolt, rivet or other fastening means 20 inserted therethrough for attaching a member to the sandwich.

It is to be understood that certain changes and modifications as illustrated and described may be made without departing from the spirit of the invention or the scope of the following claim.

I claim:

The method of inserting a spirally wound spacer member between spaced laminae of a pre-assembled structural member, where the laminations have alined openings therethrough of lesser diameter than the outer diameter of the spacer member, which method comprises, rotating the spacer member about a shaft extending btween the laminae from one edge of one opening to the opposite edge of the other opening until the spacer member is partially threaded through one opening into the space between the laminae, and then swinging said shaft in the opposite direction while maintaining contact between opposed peripheral edges of the spaced openings whereby the shaft rolls the spacer through the opening and between the spaced laminae.

References Cited by the Examiner
UNITED STATES PATENTS
2,563,976   8/51   Torosian _____ 29—428 X WHITMORE A. WILTZ, *Primary Examiner.*

CHARLIE T. MOON, *Examiner.*